United States Patent [19]

Anderson

[11] Patent Number: 4,677,012
[45] Date of Patent: Jun. 30, 1987

[54] HONEYCOMB STRUCTURE WITH BAND JOINED FOLDED MATERIAL AND METHOD OF MAKING SAME

[75] Inventor: Richard N. Anderson, Owensboro, Ky.

[73] Assignee: Hunter Douglas Inc., Totowa, N.J.

[21] Appl. No.: 796,038

[22] Filed: Nov. 7, 1985

[51] Int. Cl.[4] .............................................. B32B 3/12
[52] U.S. Cl. ................... 428/116; 156/197; 160/84 R
[58] Field of Search ............ 52/806; 156/197; 428/116, 117, 118, 188; 160/84 R

[56] References Cited

U.S. PATENT DOCUMENTS

| Re. 30,254 | 4/1980 | Rasmussen | 428/906 X |
|---|---|---|---|
| Re. 31,129 | 1/1983 | Rasmussen | 428/116 X |
| 1,677,714 | 7/1928 | Frease | 428/188 X |
| 1,827,718 | 10/1931 | Whitney | 428/188 X |
| 2,020,639 | 11/1935 | Grayson et al. | 428/130 |
| 2,201,356 | 5/1940 | Terrell | 428/116 X |
| 3,077,223 | 2/1963 | Hartsell et al. | 428/118 X |
| 3,164,507 | 1/1965 | Masuda | 428/116 X |
| 3,168,432 | 2/1965 | Elfving | 428/116 |
| 3,669,820 | 6/1970 | Fredericks | 428/116 |
| 3,788,922 | 1/1974 | Rasmussen | 428/116 X |
| 3,892,898 | 7/1975 | Yasui | 428/12 X |
| 4,001,474 | 1/1977 | Hereth | 428/116 |
| 4,288,485 | 9/1981 | Suominen | 428/188 X |
| 4,307,768 | 12/1981 | Anderson | 160/84 R |
| 4,388,354 | 6/1983 | Suominen | 428/188 X |
| 4,390,575 | 6/1983 | Kopp | 428/188 X |
| 4,450,027 | 5/1984 | Colson | 156/197 X |

FOREIGN PATENT DOCUMENTS 756270  9/1956  United Kingdom ............... 428/116

Primary Examiner—Henry F. Epstein
Attorney, Agent, or Firm—Pennie & Edmonds

[57] ABSTRACT

A honeycomb structure formed of a continuous length of foldable material having its longitudinal edges folded over one side of the material and secured to a separate strip material. The strip material is also secured to the adjacent cell of the structure. In forming the honeycomb structure, a continuous length of material is fed longitudinally as the edges thereof are folded over onto one side. The strip material is then fed over the folded material and the edges of the strip material are secured to the folded edges of the continuous length of material. The combined structure is then directed into a loop whereby the center portion of the strip material comes into engagement with the other side of the continuous length of material and secured thereto to form the overlying cells.

20 Claims, 7 Drawing Figures

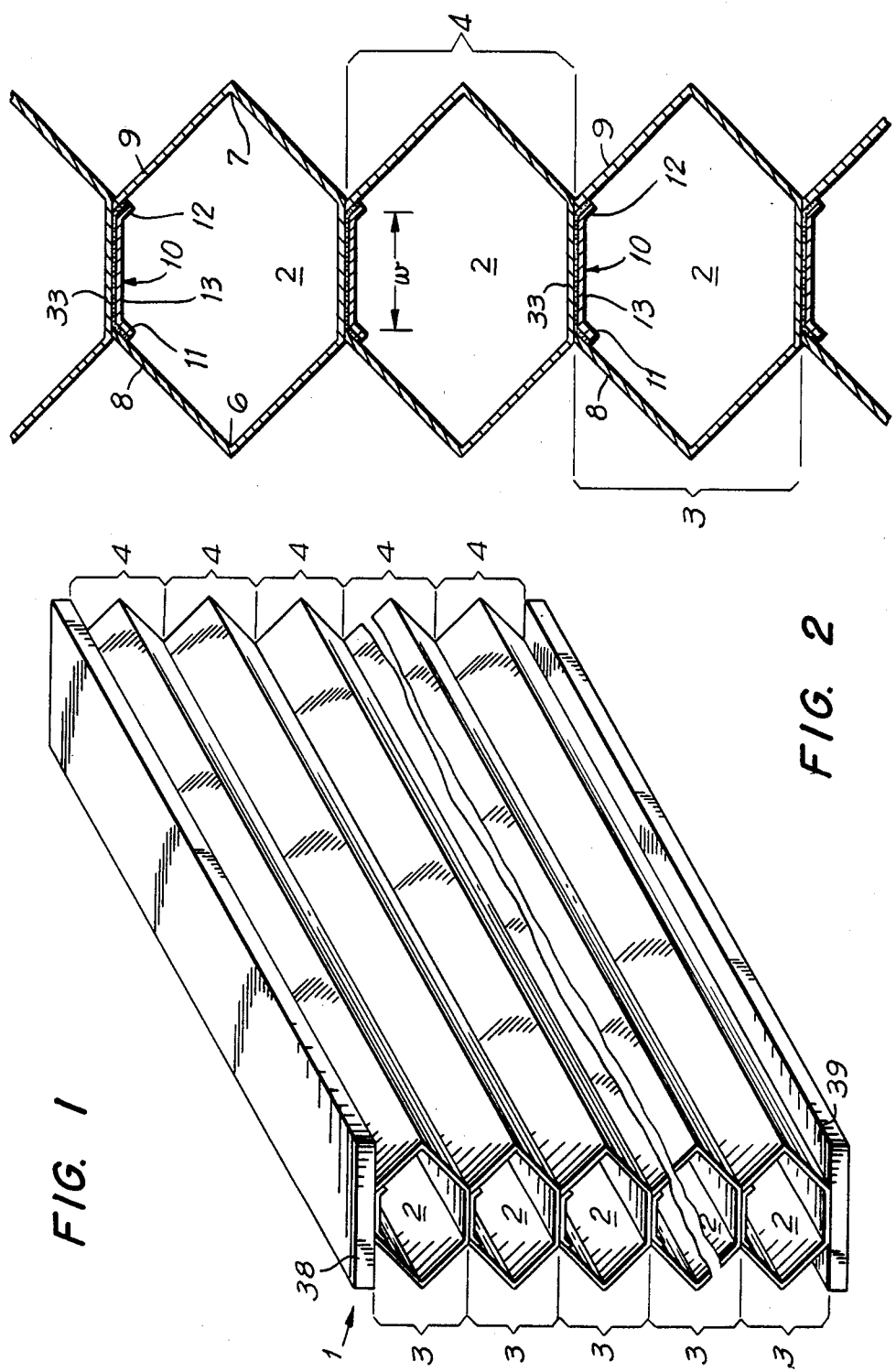

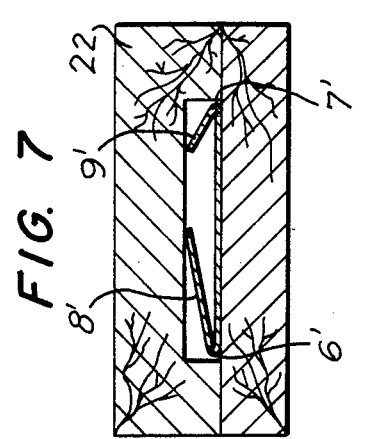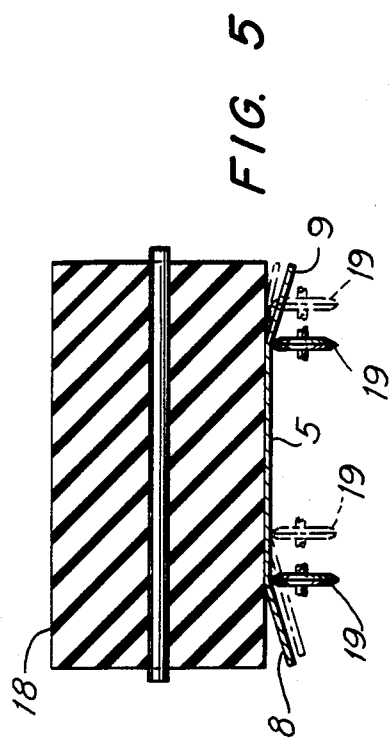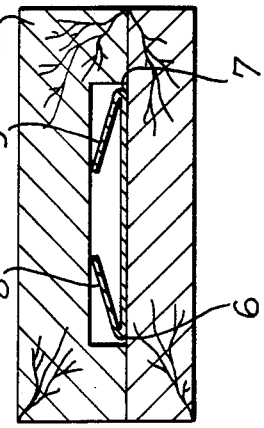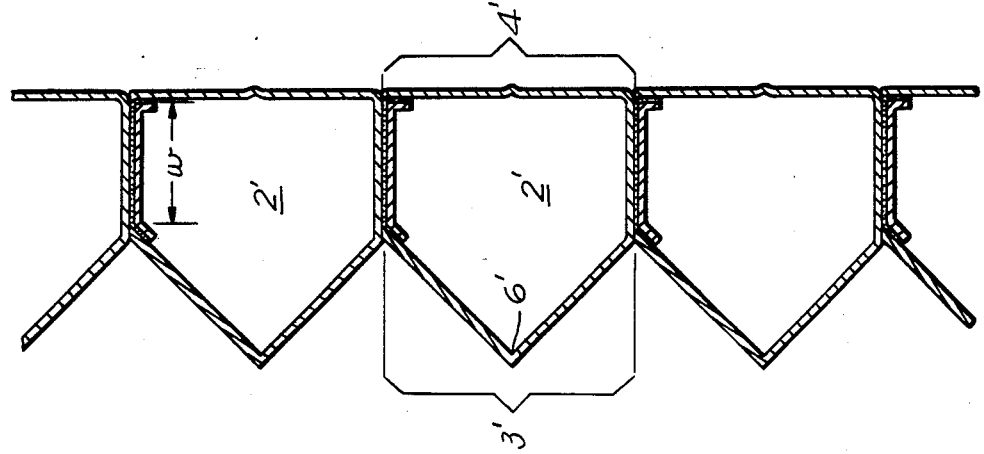

HONEYCOMB STRUCTURE WITH BAND JOINED FOLDED MATERIAL AND METHOD OF MAKING SAME

BACKGROUND OF THE INVENTION

The present invention relates to an expandable honeycomb structure such as used for window coverings. The structure is made of foldable material which in the expanded condition defines a plurality of longitudinally extending cells, one on top of the other. In the retracted state of the honeycomb structure, the adjacent cells are collapsed on each other.

The prior art discloses various honeycomb structures made from foldable material. Representative of such prior art are the Rasmussen U.S. Pat. Nos. Re. 30,254, and Re. 31,129, the Suominen U.S. Pat. Nos. 4,288,485 and 4,388,354, and the Masuda U.S. Pat. No. 3,164,507. In addition, U.S. Pat. No. 4,450,027 to Colson discloses a honeycomb structure constructed from foldable material which is folded longitudinally of the material and wound onto a rack in overlying layers. The layers are adhered together to form the cells of the honeycomb structure. The present invention is most directly a variation of the honeycomb structure and method of making it as disclosed in the '027 patent.

In constructing honeycomb structures from a single length of material in accordance with the teachings of the '027 patent, the opposite longitudinal edges of the length of material are progressively folded over one side of the material. Adhesive is then applied to the exposed longitudinal edges whereby they adhere to the overlying layer of folded material as it is wound onto the rack. With the single folded construction of the '027 patent, the application of the adhesive must be carefully controlled so as not to interfere with the processing operation and in particular, the stacking operation. Also, the choice of adhesive used must be carefully chosen to be compatible with the material from which the honeycomb structure is being formed. Improper choice and application of adhesive can produce an unacceptable product.

Where the honeycomb structure is to be used for window coverings or panels, it is often desirable to fabricate the honeycomb structure from somewhat porous material. This is desirable to give, for example, a translucent effect to the honeycomb structure when, in its expanded condition, covering a window. With porous material, there is an increased tendency for any adhesive to bleed through the material. This in turn, can result in the opposite walls of the individual cells becoming adhered together as they are wound onto the rack in overlapping layers. Examples of suitable materials are non-woven fibers of polyester, woven material from plastic or textile fibers plus plastic. Also, laminates can be used. With these materials, it will be the absorbtion in and through a somewhat porous layer that creates the bleeding through problem. When this results, the product is either unusable or the cells must be carefully pulled to their expanded condition before the adhesive has fully set. This sometimes is not possible or feasible, and, in any event, it increases the manufacturing costs.

In addition to manufacturing problems which can result from improper application of the adhesive, the choice of adhesive can also result in an unsuitable product. Honeycomb structures as used for window openings are, in many situations, subjected to continuous and severe sun conditions. These conditions can have an adverse affect on the adhesive causing separation of the adjacent cells. Obviously, this is undesirable. Although suitable adhesives to prevent this are available, they may be incompatible with the manufacturing process as discussed above.

Another aspect of the honeycomb structures of the prior art relates to the creasing or pleating of the material along fold lines to form each cell. One reason pleating is provided is to assist in the orderly collapsing of the individual cells as the structure is moved between an expanded and a retracted position. Without pleats, the collapsing of the cells would tend to be haphazard and not give a neat appearance to the structure.

In the cell construction disclosed in the '027 patent, the pleats are formed to be permanent so that the faces of the honeycomb structure extend in an angular configuration in the expanded condition of the structure. If the pleats are not carefully and properly formed, they will tend to hang out. This is especially so after long, continued use of the structure with the expanded condition being one where the cells lie one below the other. In such an orientation, the weight of the structure itself pulls on the material of the overlying cells with the greatest forces being exerted at the top of the structure by the entire weight of the underlying cells. Any falling out of the pleats tends to increase the overall height of the structure over the height as initially manufactured. The effect of this can be unpleasing and unsatisfactory, both aesthetically and physically.

SUMMARY OF THE INVENTION

According to the teachings of the present invention, an expandable-collapsible honeycomb structure is provided from a length of material having its opposite longitudinal edges folded over on one side of the material and secured to a second separate strip of material. The strip of material also functions to connect each cell of the honeycomb structure to the adjacent overlying cell. With different material being used to complete each cell and connect them to the adjacent cells, the problems encountered with adhesives of the prior art can be avoided. In particular, the strip material can be of different physical characteristics than the material from which the rest of the honeycomb structure is formed. Also, the choice of adhesives can be widened. Thus, bleeding of the adhesive through the material and the attending manufacturing problems can be avoided. Also, adhesives which are less susceptible for deterioration from extreme sunlight can be used.

With applicant's invention, it is also possible to adjust the folding of the longitudinal edges of the material; and the second strip material can thus be secured to these edges at a location offset from the center of material. With appropriate pleating on the opposite faces of the honeycomb structure, one side of the structure can be made to hang straight in the expanded condition of the structure, resulting in no tendency of the pleats on the other side of the structure to fall out during extended use.

In accordance with the method of forming the honeycomb structure of the present invention, a first continuous length of material is fed along its length and its opposite longitudinal edges are folded over one side of the material. This folded material is then aligned with a second material in strip form which is fed into overlying relation with the one side of the folded material. These aligned materials are then wound into a continuous loop to form layers of folded and strip material. These layers are adhered together by connecting the strip material to the facing surface of the next layer of material. At the same time or preceding this connection of the adjacent layers, the strip material is itself connected to the folded longitudinal edges of the folded material. The connected layers form the individual cells of the honeycomb structure when the loop is cut into a finite length.

With applicant's invention, the material is advantageously creased along fold lines during the folding process. These folds can be creased to the extent necessary to permit an orderly collapsing of the cells and they can also be made permanent to the extent that they prohibit falling out of the creases in the expanded condition of the honeycomb structure. Where the structure is to be used as a window covering and the pleated appearance is to be provided on only one side of the honeycomb structure, the folding of the material is such that the material of the other side of the structure will fall out in a straight plane in the normal expanded condition of the structure.

BRIEF DESCRIPTION OF THE DRAWINGS

FIG. 1 is a perspective view of the honeycomb structure in its expanded condition and fabricated according to the teachings of the present invention;

FIG. 2 is a cross-sectional view of a number of adjacent cells of the honeycomb structure shown in FIG. 1;

FIG. 3 is a cross-sectional view of a number of cells of a modified embodiment of the honeycomb structure shown in FIGS. 1 and 2;

FIG. 5 is a cross-sectional view taken along lines 5—5 of FIG. 4;

FIG. 6 is a cross-sectional view taken along lines 6—6 of FIG. 4; and

FIG. 7 is a cross-sectional view similar to FIG. 6 showing a modified embodiment of the folded construction of the cell material.

DETAILED DESCRIPTION OF THE PREFERRED EMBODIMENTS

Figure 4:
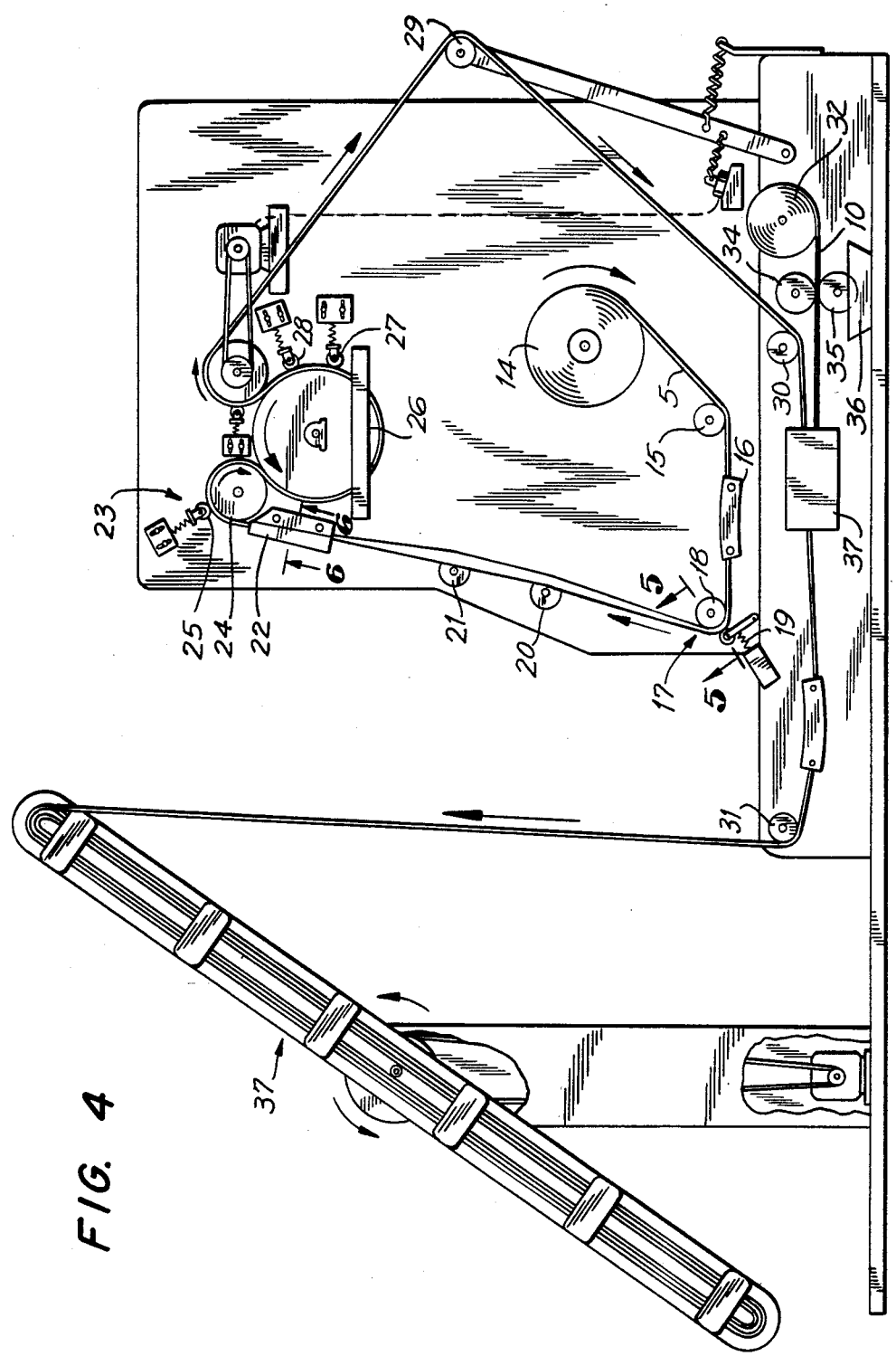
FIG. 4 is a plan view of a suitable apparatus for fabricating the honeycomb structure according to the teachings of the present invention.

As shown in FIGS. 1 and 2, the expandable honeycomb structure of the present invention generally designated by reference number 1, is constructed of a plurality of longitudinally extending cells 2. Each cell has a longitudinally extending front face 3 and a longitudinally extending back face 4. For the purpose of easy identification, the faces 3 are referred to as front faces, and the faces 4 as back faces. "Front" and "back" hold no limitation as to the position of the structure, for example, when used as window coverings in building constructions. Also, "honeycomb38 is used in the broad sense to mean connected cells, not necessarily hexogonal, as described and shown herein. Each cell is constructed of a foldable material 5 folded along longitudinally extending fold lines 6 and 7 and having its opposite longitudinally extending edges 8 and 9 secured to a second length of material 10. This length of material is in strip form and separate from the foldable material. It extends longitudinally between the cells in their completed condition and connects adjacent cells together. More particularly, the longitudinal edges 11 and 12 of the strip material are connected to the longitudinal edges 8 and 9, respectively, of the folded material and the central longitudinally extending portion 13 of the strip material is connected to the foldable material of the overlying cell structure.

In the construction shown in FIGS. 1 and 2, the opposite longitudinal edges 8 and 9 of the foldable material 5 are spaced from each other by a distance w. The central section 13 of the strip material 10 is thus exposed across this width w and connected to the overlying cell across this same distance. This attachment of the adjacent cells spaces the front face of each cell from the back face 4 by the distance w. In the construction shown in FIGS. 1 and 2, the connection of the cells across the distance w is located centrally of the honeycomb structure to produce a symmetrical construction.

In the construction shown in FIG. 3, the connection of the adjacent cells is laterally offset from the center of the honeycomb structure. Thus, the front face of each cell has a greater amount of material extending between adjacent cells than the back face thereof. By controlling this offset and the amount of creasing along the fold lines 6', 7', back face 4' of each cell can be made so that the folds 7' hang out in the normal expended condition of the structure. With this, no further expansion of the cells is possible. Thus, the pleated configuration on the front face 3' of each cell has no further tendency to pull out. To attain this construction, the creasing along fold line 7' is made sufficient to assist in the normal orderly collapsing of the cell, but is not of sufficient strength to prevent falling out in the expanded condition of the structure. The crease along the fold line 6', however, is made permanent where the sharp angular configuration is desired.

In accordance with the method of manufacture of the honeycomb structure, the apparatus of U.S. Pat. No. 4,450,027, suitably modified, is used. Accordingly, the disclosure of the '027 patent is incorporated herein by reference.

FIG. 4 of the present application is a plan view of the apparatus of the '027 patent as modified in accordance with the teachings of the present invention. As shown in FIG. 4, a supply of foldable material 5 is provided by a roll 14 of the material. The material may be a thin film of polyester plastic or Mylar or any other material, such as those previously mentioned, having similar or suitable characteristics for honeycomb structures. From the supply roll 14, the length of material is directed around the guide roller 15 and through the alignment block 16. The material is then creased by passing it through a creaser assembly 17. This creaser assembly, as shown in FIG. 5, includes a backing roller 18 and cooperating creaser wheels 19. These wheels have sharp peripheral surfaces; and as a length of material 5 passes between the backing roller and creaser wheels, a pair of creases 6 and 7 are formed in the material on one side thereof. These creases define fold lines of demarcation between the opposite longitudinal edges 8 and 9 of the material and the central section thereof.

From the creaser assembly 17, the material passes around two folding rollers 20, 21. As with the apparatus of the '027 patent, these folding rollers are offset from a straight line between the creaser roller 19 and a folding mechanism 22. These folding rollers, together with the folding mechanism 22 fold the length of material 5 longitudinally along the crease lines 6 and 7. The folding is such as to fold both longitudinally edges 8 and 9 over the one side of the length of material. This folding is done progressively as the length of material is fed through the apparatus. The folded condition of the length of material as it exits from the folding mechanism 22 is shown in FIG. 6. As there seen, the folding leaves the longitudinal edges spaced from each other.

After folding of the material, it is directed through a crimper assembly 23 which is comprised of facing crimp rollers 24 and 25. These rollers are aligned with each other and overlie one or both of the fold lines 6 and 7 to tightly press and squeeze the material so as to form a permanent folds along either or both of these lines. Depending on the nature of the material, this crimper may or may not be necessary. Where the material has the characteristics of the polyester film material disclosed in the '027 patent, the crimper assembly 23 would be utilized. Also with such material, the fold can be assured of being permanently set by further passing the folded material around the peripheral surface of the roller 26 which is heated. This roller and the cooperating press rollers 27 and 28 apply rolling pressure across the entire width of the material to set the crimps permanently at a sharp angle. Again, the roller structure 27 and 28 need not be included where the material does not require its use. Further, other structures may be used, provided that the fold lines 6 and 7 are properly set to maintain the angular configuration shown in FIG. 1. Also, in some situations, it may not be desirable to have permanent fold lines in both or either of the faces of the final honeycomb structure. Instead, it may be desirable to have fold lines which only aid in assuring that the cells collapse in an orderly fashion.

After folding of the length of material, it is directed around suitable guide rollers 29, 30, 31 as more fully described in the '027 patent. As the material passes between the guide rollers 30 and 31, the strip of material 10 is progressively fed in the same direction as the foldable material and into overlying relation therewith. More specifically, it is fed into overlying relationship with respect to the side of the material 5 over which the longitudinal edges 8 and 9 have been folded. Prior to effecting this overlying relation, the side of the strip material 10 facing away from the folded materials 5 is coated with adhesive 33. This is done by passing the strip material between a pair of rollers 34, 35. Roller 35 is supplied with the adhesive from a source 36.

In the embodiment of the honeycomb structure shown in FIGS. 1 and 2, the edges of the strip material are adhered to the inside surfaces above the folded longitudinal edges 8 and 9. In order to do this, the strip material 10 must be fed into overlapping alignment with these longitudinal edges and located between them and the side of the material over which they have been folded. For this purpose, an aligning mechanism 37 is provided. This mechanism may be of any suitable construction to open or maintain the folded edges 8 and 9 of the foldable material in open condition so as to receive the strip material 10 and align it properly. Alternatively, the strip material 10 can be fed into overlapping relation with the foldable material at other points along the path of movement of the foldable material through the apparatus.

After the foldable material 5 and the strip material 10 have been aligned in overlying relationship, both materials are fed around the roller 31 and into a stacking area. There they are wound on a stacking arm 37 and into a continuous loop with successive portions of the materials overlying preceding portions. This forms a plurality of stacked layers of folded and strip material on the stacking arm. During the stacking operation, the adhesive 33 on the strip material is pressed into engagement with the facing side of the folded material of the layer overlying it. This adheres the exposed section 13 of the strip material to the overlying layer to form a unitary stack of closed expandable cells.

After the desired amount of folded material is stacked on the stacking arm 37, the length is severed from the supply coming from guide roller 31 and the layers of the loop are severed to form a unitary stack of cells of finite length as shown in FIG. 1. Alternatively, the layers of the loop can be cut into a number of unitary stacks of cells of finite length. The honeycomb structure is completed by the head and bottom rail structures 38 and 39.

Where it is desired to produce the structure shown in FIG. 3, the folding of the opposite edges of the length of material is adjusted by folding them over onto the center section of the length by different width distances. With reference to FIG. 7, the longitudinal edge of 8' of the length of material is folded along the fold line 6' to a width greater than the folding of the longitudinal edge 9' along the fold line 7'. FIG. 5 shows in dotted lines the adjustment required of the creaser wheels 19 for this purpose. The connection of the strip material 10 to these laterally offset edges 8' and 9' will result in the construction of FIG. 3 and the front face 3' of each cell will have more material extending between adjacent cells than the back face thereof. Thus, if no more than a minimal or no crease is effected along the fold line 7', this fold will hang out when the cells are expanded and the other face of the honeycomb structure will have pleats which will not fall out over a period of extended use. Effectively, to produce this result, the longitudinal edge 9' is folded over the crease or fold line 7' by a distance equal to half the distance any one cell extends between its adjacent cells in the normal expanded condition of the honeycomb structure. This distance can be easily controlled to accurately produce a structure with a precise height in its expanded condition.

I claim:
1. In an expandable honeycomb structure constructed of foldable material and defined by a plurality of longitudinally extending cells, one on top of the other, each pair of adjacent cells being interconnected and each cell having a longitudinally extending front face and a longitudinally extending back face, the improvement wherein:
    (a) the material which interconnects the adjacent cells is a strip of material separate from said foldable material and extending longitudinally of the cells; and
    (b) each cell is constructed with the foldable material having its opposite longitudinal edges folded over one side of the material and connected to said strip material.
2. The improvement in a honeycomb structure according to claim 1 wherein:
    (a) the opposite longitudinal edges of the foldable material are spaced from each other by a predetermined distance.
3. The improvement in a honeycomb structure according to claim 2 wherein:
    (a) the front face of each cell is spaced from the back face thereof by a distance equal to said predetermined distance.
4. The improvement in a honeycomb structure according to claim 3 wherein:
    (a) each cell is connected to the next adjacent overlying cell across the entire spacing between the front and back faces thereof.

5. The improvement in a honeycomb structure according to claim 4 wherein:
  (a) the strip has an adhesive surface on one side thereof with:
    (i) the longitudinal edges thereof disposed between the folded over edges and one side of the foldable material and adhered to the folded over edges, and
    (ii) the center section thereof adhered to the bottom of the overlying next adjacent cell.

6. A raisable window covering comprising:
  (a) an expandable-collapsible panel of the honeycomb construction of any one of claims 2-5.

7. The improvement in a honeycomb structure according to any one of claims 2-6 wherein:
  (a) the front face of each cell has a greater amount of material extending between the adjacent cells than the back face thereof.

8. The improvement in a honeycomb structure according to claim 7 wherein:
  (a) the front face of each cell includes a longitudinally extending crease maintaining said face in an angular configuration in the normal expanded condition of honeycomb structure.

9. The improvement in a honeycomb structure according to claim 8 wherein:
  (a) the back face of each cell extends in a straight plane between said adjacent cells in the normal expanded condition of the honeycomb structure.

10. The method of fabricating an expandable honeycomb structure comprising the steps of:
  (a) continuously feeding a continuous length of foldable material longitudinally of said length;
  (b) progressively folding both longitudinal edges of the length of foldable material over one side thereof;
  (c) progressively feeding a length of strip material in the same direction as the foldable material and into overlying relation with said one side thereof;
  (d) feeding the folded length of material with the overlying strip material into a continuous loop in a stacking area with successive portions thereof overlying preceeding portions to form a plurality of adjacent stacked layers;
  (e) connecting the strip material to the folded over edges of the foldable material;
  (f) connecting the strip material to the overlying layer in said loop to form a unitary stack of closed expandable cells; and
  (g) severing the layers of the loop into at least one unitary stack of cells of finite length.

11. The method according to claim 10 wherein:
  (a) the strip material is connected to folded over edges of the foldable material prior to the feeding thereof into said continuous loop.

12. The method according to claim 11 wherein:
  (a) said length of strip material is fed into overlying relation with the one side of the foldable material after the folding thereof.

13. The method according to claim 12 further comprising the steps of:
  (a) folding the longitudinal edges of the foldable material over the one side thereof and into laterally spaced relation with respect to each other; and
  (b) feeding the strip material between the folded longitudinal edges of the folded material and the one side thereof with the longitudinal edges of the strip material aligned in overlapping relation with the folded over edges.

14. The method according to claim 13 further comprising the steps of:
  (a) applying adhesive to the side of the strip material facing away from the one side of the folded material prior to feeding the strip material between the folded edges and the one side thereof.

15. The method of fabricating an expandable honeycomb structure comprising the steps of:
  (a) continuously feeding a continuous length of foldable material longitudinally of said length;
  (b) progressively folding both longitudinal edges of the length of foldable material over one side thereof;
  (c) progressively feeding a length of strip material in the same direction as the foldable material and over said one side thereof;
  (d) progressively aligning both longitudinal edges of the length of foldable material in overlapping alignment with the longitudinal edges of the strip material to leave at least a center longitudinally extending section of the strip material exposed;
  (e) feeding the folded length of foldable material with the strip material into a continuous loop in a stacking area with successive portions thereof overlying preceding portions to form a plurality of adjacent stacked layers;
  (f) connecting the aligned edges of the foldable material and the strip material together;
  (g) connecting the exposed section of the strip material to the overlying layer to form a unitary stack of closed expandable cells; and
  (h) severing the layers of the loop into at least one unitary stack of cells of finite length.

16. The method according to claim 15 wherein:
  (a) the longitudinal edges of the foldable material are folded over the longitudinal edges of the strip material to leave only the center section thereof exposed for connection to the overlying layer in the loop.

17. The method according to claim 16 wherein:
  (a) adhesive is applied to the entire side of the strip material facing away from the one side of the foldable material before the longitudinal edges of the foldable material are folded over the longitudinal edges of the strip material.

18. The method according to any one of claims 10-17 wherein:
  (a) one longitudinal edge of the foldable material is folded over the one side thereof by a longer width than the other longitudinal edge.

19. The method according to claim 18 wherein:
  (a) the other longitudinal edge of the foldable material is folded over the one side thereof by a distance equal to half the distance any one cell extends between adjacent cells in the normal expanded condition of the honeycomb structure.

20. The method according to claim 19 wherein:
  (a) the one longitudinal edge of the foldable material is folded along a fold line and creased along said fold line to maintain the material thereof in an angular configuration in the normal expanded condition of the honeycomb structure.

* * * * *